March 14, 1961 TADAO YOSHIDA 2,974,372
SPIRAL SLIDE-FASTENER ELEMENTS
Filed July 23, 1959 5 Sheets-Sheet 1
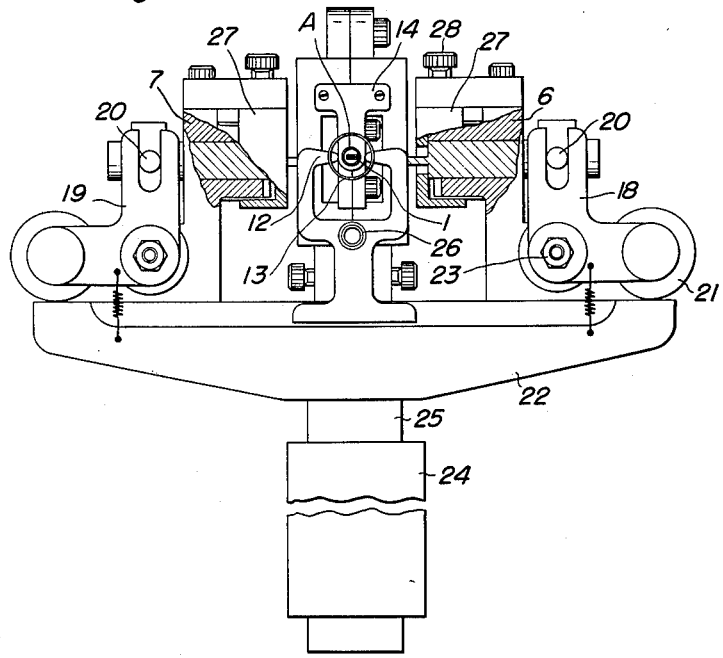
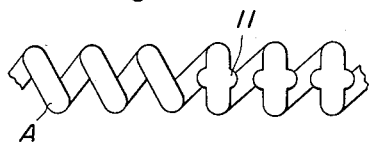
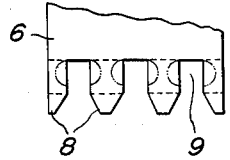
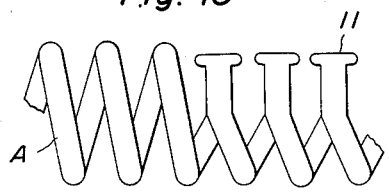
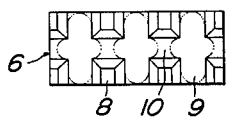

United States Patent Office 2,974,372
Patented Mar. 14, 1961

2,974,372

SPIRAL SLIDE-FASTENER ELEMENTS

Tadao Yoshida, 339/2 Suwadacho, Ichikawa-shi, Chiba-ken, Japan

Filed July 23, 1959, Ser. No. 829,086

Claims priority, application Japan Oct. 8, 1958

1 Claim. (Cl. 18—56)

The present invention relates to a method of and apparatus for manufacturing spiral slide-fastener elements, and particularly to a method of and apparatus for continuously producing such fastener elements from vinyl or polyethylene series resins.

According to the present invention, a cord or wire material made of a synthetic resin to be formed into fastener elements is wound helically around a flat and straight mandrel along with its rotation, which mandrel is intermittently rotated and reciprocated longitudinally at regular intervals of time. When the mandrel has been rotated and advanced for a fixed period of time, it is caused to stop the rotation and is retreated by the distance of said advance, leaving the flat coil formed of the wound wire material within a helical guide groove. The above operation is periodically repeated, and the wire material is wound into a continuous flat coil turn by turn. The coil thus formed is advanced by the subsequent advance and rotation of the mandrel. The coil arrives at pressure dies, when the mandrel stops rotation and retreats. Then, the coil stops the advance and is held in and pressed by the pressure dies to be subjected to a forming operation. By this forming operation, engaging portions of fastener elements are formed on the successive turns of the coil. While the coil and engaging portions are being formed, the wire material is heated to be in a moldable state.

An object of the present invention is to provide a method of and apparatus for continuously producing continuous fastener elements provided with one engaging portion on each turn of the coil.

Another object of the present invention is to provide a method of manufacturing helical slide-fastener elements comprising steps of forming a continuous flat helical coil of a wire material by helically winding the latter around a flat straight mandrel while said mandrel is being rotated and advanced by one pitch of a helical groove, stopping the rotation of said mandrel, retreating said mandrel without rotation, leaving said wire material in said helical groove, concurrently heating said wire material into a moldable state, die forming an engaging projection on each turn of said coil at one side thereof after said coil is driven out from said helical groove by the subsequent rotational advance of said mandrel, and cooling for fixing the shaped article.

A further object of the present invention is to provide a spiral slide-fastener forming machine for carrying out the above-mentioned method comprising a flat straight mandrel, means for longitudinally reciprocating said mandrel with a fixed period, means for rotating said mandrel during the advancing motion of its reciprocation, a helical groove provided along said mandrel, press dies disposed outside said spiral groove, means for moving said dies to and from said mandrel, a heating device surrounding the outside of said spiral groove, a mechanism for operating said dies when the advancing motion of the mandrel has stopped, and a mechanism for synchronizing the operations of said dies and mandrel.

Other objects and particularities of the present invention will be obvious from the following descriptions with reference to the accompanying drawings, in which:

Figure 1 is an end elevational view of a spiral slide-fastener forming machine embodying the present invention;

Figure 7 is a side view showing the press die in said spiral forming head;

Figure 8 is a plan view showing the bottom surface of the press die shown in Figure 7;

Figure 9 is a plan view of a coil having engaging projections on its several turns formed by use of the present machine; and Figure 10 is a side view of the same.

Figure 2:
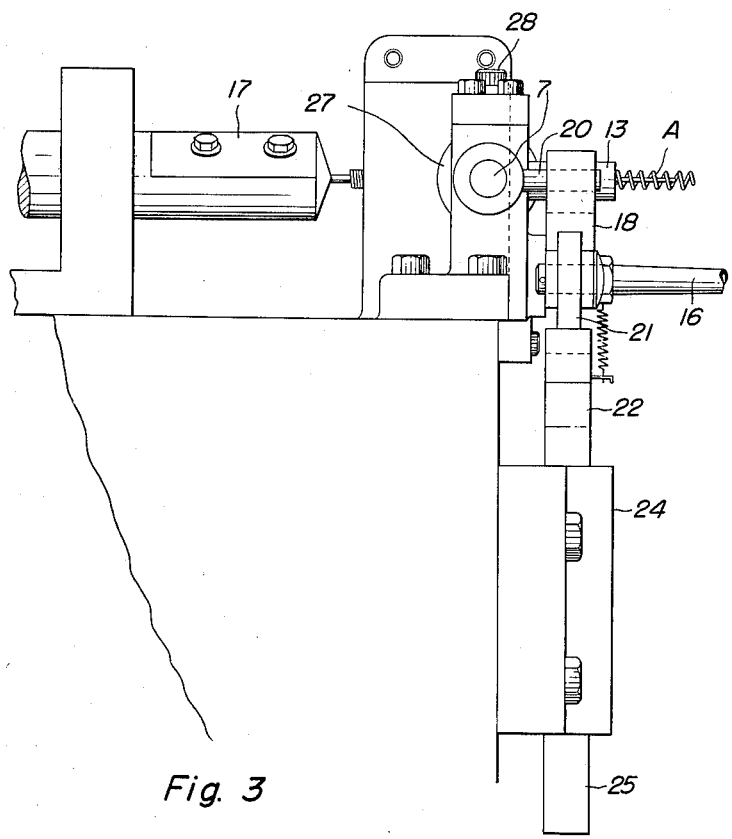
Figure 2 is a side elevational view of the spiral forming head and associated parts shown in Figure 1.
Figure 3:
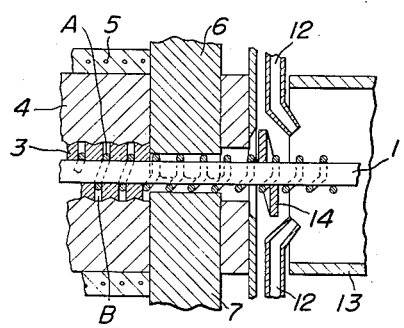
Figure 3 is an enlarged sectional view of said head proper.

A long mandrel 1 is flat and straight, and made of tough material. The end portion of a cord or wire material 2 is wound around or otherwise secured releasably to said mandrel and introduced thereby into the helical groove B formed by a helical body 3 by the simultaneous rotation and advancement of the mandrel 1. As the rotation and advancement correspond to the pitch of the helices, a helical coil A of a definite pitch is directly made. As the mandrel does not rotate during the period of retreat, the coil remains in the spiral groove B as it is. During the next rotation and advancement of the mandrel, the coil A again accompanies the mandrel and is rotated and advanced in the spiral groove, while the following portion of the wire material is introduced into the spiral groove just as the preceding portion and formed into helices. Thus, for each advancement of the mandrel, one turn of a helical coil is fed out of the groove. A pair of mounting plates 4 hold therebetween and fix the helical body 3, and also conduct the heat of a suitable heater 5 mounted outside the plates so as to keep the helical body 3 at a substantially constant temperature sufficient to maintain the thermoplastic wire material in the helical groove in a moldable state.

Press dies 6 and 7 are disposed adjacent the discharge end of the helical body 3. As shown in Figures 7 and 8, the die 6 is provided at the forward end with several, say four, projections 8 coinciding with the pitch of the helices, recesses 9 being formed therebetween in which the coil turns are to fit, and clearances 10 being left between the projections. The projections 8 are provided with definite spacings, corresponding to the pitch of the coil A delivered from the helical body by each advancement of the mandrel.

Therefore, by the press operation of the dies, an engaging projection 11 (Figs. 9 and 10) is formed on each turn of the coil at one side of the latter and these engaging portions 11 are shaped to be parallel to each other. The dies are kept heated by the heater 5, and the coil can be worked very easily. Cooling air blowing nozzles 12 are arranged to direct the cooling air in the direction of feed of the coil in a cylinder 13 into which the shaped fastener element is delivered through a coil guide 14. The fastener element is thus cooled and fixed in the normal form.

The coil guide 14 is provided so that the coil before being cooled may be shaped by passing through it for keeping the pitch of the coil correct. 15 is a bobbin on which the wire material is to be kept wound. 16 is a wire guide to give a constant tension to the wire being introduced onto the mandrel 1. 17 is a shaft to which the mandrel 1 is secured. 18 and 19 are die operating levers connected respectively to the dies 6 and 7 through respective arms 20 and mounted on a base plate 22 through rollers 21. 23 is a pin to enable the lever to rotate. 24 is a base plate guide fitted to slide on a supporting shaft 25. Therefore, the vertical motion of the base plate will give the levers arcuate rotation and will further give the dies reciprocation. Thus, a drive mechanism is so provided that the coil A delivered from the helical body 3 for each rotation and advancement of the mandrel 1 is subjected to the die press operation by the intermittent vertical motion of the base plate.

The general function of the above mentioned apparatus to carry out the method of the present invention will now be explained in order. The wire material 2 being unwound from the bobbin 15 is led to the base end of the mandrel 1 and the mandrel is advanced while being rotated. Since the rotation and the rate of advancement are so adjusted as to correspond to the pitch of the helical body 3, the wire material 2 driven by the mandrel is introduced into the helical groove B. When the mandrel has advanced for one pitch of the coil, it stops rotation and quickly retreats and returns to the original position, leaving the formed coil behind. The longitudinal motion of the mandrel is effected through a cam and a rack (not illustrated). In this manner, the advancement of the mandrel simultaneously advances the wire material and shapes it into a coil. When the mandrel retreats, the coil is left in the groove B of the helical body 3. Therefore, by repeating the reciprocation of the mandrel, the wire material formed into the coil is fed forward turn by turn. The press dies 6 and 7 for forming ridged projections in the engaging portions of fastener element are provided on the pressing surface, as already described, with several, say four, parallel projections 8 coinciding with the pitch of the helices and a composite surface having recesses 9 in which the coil turns are to fit and ridged clearances 10. The other die 7 consists of a mere contact surface to receive the peripheral edge on the other side of the coil so as to prevent the coil from rocking when it is pressed. By the operation of the press dies 6 and 7, the coil A is formed into a fastener element having engaging projections 11 on one side only.

By the heat conducted from the heater 5, the coil can be worked very easily. However, the coil just shaped is so soft as to readily collapse. Therefore, in order to keep the correct pitch, the coil just die pressed is shaped correctly by means of the guide 14 and is led through the cylinder 13 in which the cooling air blowing nozzles 12 open so that the coil A passing through the guide may be fixed in the correct form. Thus, the product will be finished continuously and automatically.

Figure 4:
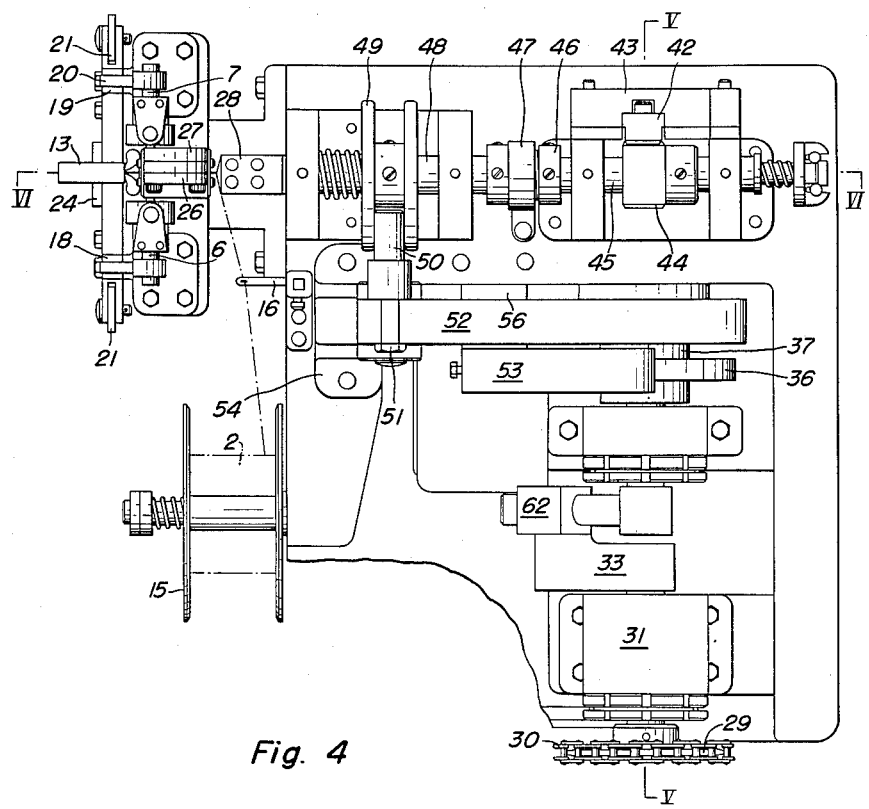
Figure 4 is a plan view of the machine shown in Figure 1.
Figure 5:
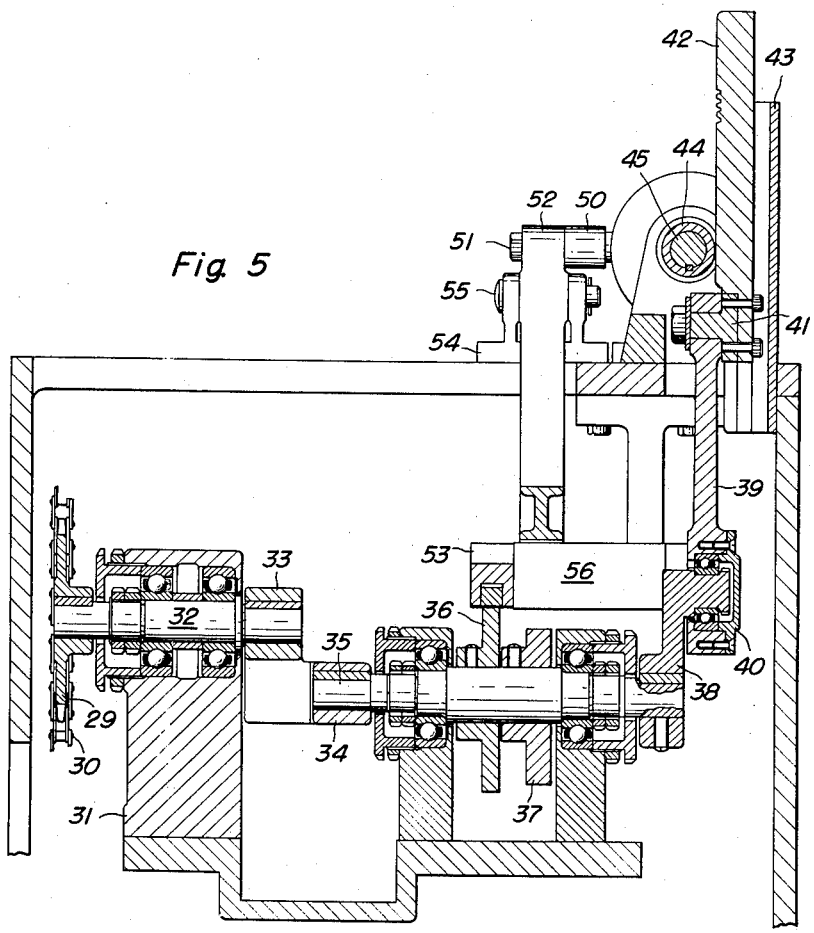
Figure 5 is a sectional view taken along line V—V in Figure 4.
Figure 6:
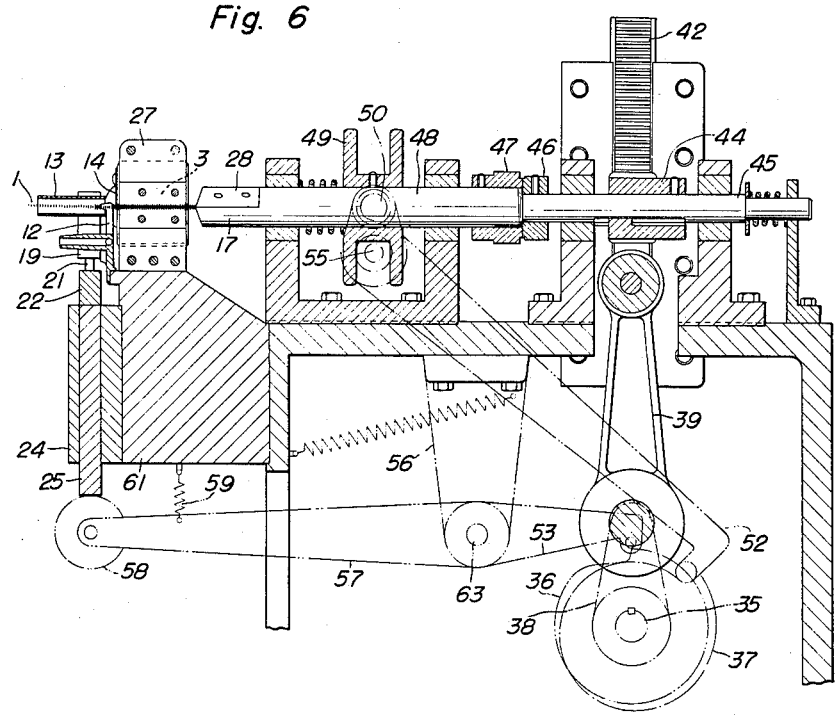
Figure 6 is a sectioned view taken along line VI—VI in Figure 4.

The synchronized driving mechanism for the press dies and mandrel as illustrated in Figures 4 to 6 will now be explained.

When shafts 32 and 35 are rotated by a chain 29, a rack 42 is reciprocated vertically through a crank 38 and a connecting rod 39. The vertical motion of the rack 42 is translated to a rotary motion of a pinion 44, which is transmitted to a shaft 45. This rotation is transmitted to a shaft 48 and in turn to the mandrel 1 fixed thereto through the engagement of clutch members 46 and 47. A cam 37 secured to the shaft 35 gives forward and rearward reciprocating motions to the shaft 48 and the mandrel, through a flange 49 by a lever 52 swingable about a pin 55 as a center. Another cam 36 is provided on the shaft 35. A vertical motion caused by the impact of the cam 36 is transmitted to supporting shafts 25 and 22 through levers 53 and 57 swingable about a pin 63 as a fulcrum. The press dies 6 and 7 are moved through the rollers 21 and levers 18 and 19.

The relation between the rotation and the forward and rearward motion of the mandrel 1 and the operation of the dies is such that, at the same time the mandrel 1 starts the next rotation, the cam 37 formed in conformity with the pitch of the helices also begins to move and the end of the lever engaging the cam begins to move an arm 50 to the left in Fig. 6. Consequently, when the rack 42 has come to the lowest point, that is, when the mandrel 1 has completed one rotation, the arm 50 will have advanced leftward by one pitch of the heices. At this time, the clutch members 47 and 46 are disengaged from each other, and the shaft 48 will stop and the shaft 45 only will rotate in the reverse direction.

When the rack 42 has passed the lowest point, the lever 52 will drop quickly due to the step on the cam 37, the arm 50 will directly move rightward and therefore the mandrel will also return rightward. Since the shaft 48 does not rotate in this case, the mandrel returns in the form of a linear motion without rotation, and therefore the coil wound around the mandrel will remain in the spiral groove.

When the mandrel 1 has moved rightward and then the shaft 35 has rotated a small angle, the lever 53 drops quickly due to the recess on the cam 36 and the lever 57 snaps up by the action of the spring 59. This motion will be transmitted to operate the dies. Thus, until the rack 42 comes to the uppermost point, the mandrel is held at rest. When the rack has passed the uppermost point, the mandrel will start the rotating and advancing motion due to the clutch members 47 and 46, and the above mentioned operation will be repeated indefinitely. It will be obvious that each turn of the coil is subjected to several, say four, times of consecutive die pressing, in order to produce a substantially complete shape.

What I claim is:

A method of continuously manufacturing helical slide-fastener elements comprising helically winding a wire around a flat mandrel while said mandrel is being rotated, advancing the wire into one pitch of a helical groove and stopping the rotation of said mandrel, withdrawing said mandrel while preventing rotation thereof, the coiled wire being left in said groove, heating said wire into a moldable state, die-forming a projection on said coil at one side thereof after said coil is driven out from said helical groove by a subsequent rotational advance of said mandrel, and cooling the wire for fixing its shape.

References Cited in the file of this patent

UNITED STATES PATENTS

| 299,802 | Kipper | June 3, 1884 |
| 2,209,114 | Dorr | July 23, 1940 |
| 2,431,928 | Garreau | Dec. 2, 1947 |
| 2,450,324 | Wilson et al. | Sept. 28, 1948 |
| 2,513,164 | Genua | July 27, 1950 |
| 2,636,523 | Hammerschlag | Apr. 28, 1953 |
| 2,740,987 | Moncrieff | Apr. 10, 1956 |